(12) United States Patent
Rahman et al.

(10) Patent No.: US 12,096,353 B2
(45) Date of Patent: Sep. 17, 2024

(54) METHODS PROVIDING TRAFFIC CONTROL FOR INCREASING DATA THROUGHPUT AND RELATED NETWORKS AND NETWORK NODES

(71) Applicant: Telefonaktiebolaget LM Ericsson (publ), Stockholm (SE)

(72) Inventors: Hasibur Rahman, Linköping (SE); Tobias Ahlström, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 420 days.

(21) Appl. No.: 17/602,517

(22) PCT Filed: Apr. 16, 2019

(86) PCT No.: PCT/IB2019/053153
§ 371 (c)(1),
(2) Date: Oct. 8, 2021

(87) PCT Pub. No.: WO2020/212731
PCT Pub. Date: Oct. 22, 2020

(65) Prior Publication Data
US 2022/0225229 A1    Jul. 14, 2022

(51) Int. Cl.
*H04B 7/0413*    (2017.01)
*H04W 48/20*    (2009.01)
*H04W 72/27*    (2023.01)

(52) U.S. Cl.
CPC .......... *H04W 48/20* (2013.01); *H04B 7/0413* (2013.01); *H04W 72/27* (2023.01)

(58) Field of Classification Search
CPC ..... H04W 48/20; H04W 72/27; H04B 7/0413
See application file for complete search history.

(56) References Cited

U.S. PATENT DOCUMENTS

2018/0124649 A1    5/2018    Yu
2019/0260428 A1*   8/2019    Hugl .................... H04B 7/0417

FOREIGN PATENT DOCUMENTS

CN    108040347 A  *  5/2018   ............ H04W 36/00

OTHER PUBLICATIONS

International Search Report and Written Opinion dated Jan. 2, 2020 for International Application No. PCT/IB2019/053153 filed Apr. 16, 2019, consisting of 11-pages.

(Continued)

*Primary Examiner* — Rahel Guarino
(74) *Attorney, Agent, or Firm* — Weisberg I.P. Law, P.A.

(57) ABSTRACT

Methods performed by a network node having a first transmission mode configuration for a first cell in a radio access network may be provided. A second transmission mode configuration for a second cell may be obtained. A mobile terminal may be steered to the first or second cell based on which cell has the transmission mode configuration for supporting a higher data throughput. A method performed by a control node in a radio access network also may be provided. A first and a second transmission mode configuration may be determined for a candidate cell and a serving cell, respectively. A serving node may be configured with the first transmission mode configuration. A mobile terminal may be steered to the candidate cell or the serving cell based on which cell has the transmission mode configuration for supporting a higher data throughput.

9 Claims, 9 Drawing Sheets

(56) References Cited

OTHER PUBLICATIONS

3GPP TS 36.412 V15.0.0; 3rd Generation Partnership Project; Technical Specification Group Radio Access Network; Evolved Universal Terrestrial Radio Access Network (E-UTRAN); S1 signalling transport (Release 15), Jun. 2018, consisting of 8-pages.
3GPP TS 36.422 V15.1.0; 3rd Generation Partnership Project; Technical Specification Group Radio Access Network; Evolved Universal Terrestrial Radio Access Network (E-UTRAN); X2 signalling transport (Release 15), Dec. 2018, consisting of 8-pages.
R. Stewart; Stream Control Transmission Protocol; Network Working Group, Request for Comments: 4960; The IETF Trust; Sep. 2007, consisting of 152-pages.
3GPP TS 36.331 V15.5.1; 3rd Generation Partnership Project; Technical Specification Group Radio Access Network; Evolved Universal Terrestrial Radio Access (E-UTRA); Radio Resource Control (RRC); Protocol specification (Release 15), Apr. 2019, consisting of 948-pages.
3GPP TS 36.423 V15.5.0; 3rd Generation Partnership Project; Technical Specification Group Radio Access Network; Evolved Universal Terrestrial Radio Access Network (E-UTRAN); X2 application protocol (X2AP) (Release 15), Mar. 2019, consisting of 414-pages.

\* cited by examiner

| | R10 UE 64QAM 20ms(UL-DL:2, Special: 7) | | |
|---|---|---|---|
| | TM9 8x4 | TM9 8x2 | TM3 8x2 |
| Peak Throughput Unit: Mbps | 174.89 | 93.4784 | 112.4736 |
| | R10 UE 256QAM 20ms(UL-DL:2, Special: 7) | | |
| | TM9 8x4 | TM9 8x2 | TM3 8x2 |
| Peak Throughput Unit: Mbps | 233.9256 | 130.088 | 142.985 |

Figure 5

| IE/Group Name | Presence | Range | IE type and reference | Semantics description | Criticality | Assigned Criticality |
|---|---|---|---|---|---|---|
| TM9 capable | O | | BIT STRING (1) | Indicates if a cell is TM9 capable. Value 0: not TM9 capable Value 1: TM9 capable | -- | -- |

Figure 6

| IE/Group Name | Presence | Range | IE type and reference | Semantics description | Criticality | Assigned Criticality |
|---|---|---|---|---|---|---|
| TM9 MIMO layer capability | O | | ENUMERATED (twoLayers, fourLayers, eightLayers) | Indicates if a cell supports MIMO two layers, four layers or 8 layers, etc. | -- | -- |

Figure 7

| IE/Group Name | Presence | Range | IE type and reference | Semantics description | Criticality | Assigned Criticality |
|---|---|---|---|---|---|---|
| TM9 MIMO 4-layers capability | O | | BIT STRING (1) | Indicates if a cell supports four-layers MIMO.<br><br>Value 0: Four-layers MIMO is not supported<br><br>Value 1: Four-layers MIMO is supported | - | - |

Figure 8

| IE/Group Name | Presence | Range | IE type and reference | Semantics description | Criticality | Assigned Criticality |
|---|---|---|---|---|---|---|
| TM9 capability | O | | BIT STRING (8) | Each bit represents one of the TM9 capabilities.<br>First bit = if cell is TM9 capable, second bit = if cell supports two MIMO layers, third bit = if cell supports four MIMO layers, fourth bit = if cell supports eight MIMO layers. Other bits reserved for future use<br>Value 0: not present<br>Value 1: present | - | - |

Figure 9

METHODS PROVIDING TRAFFIC CONTROL FOR INCREASING DATA THROUGHPUT AND RELATED NETWORKS AND NETWORK NODES

CROSS-REFERENCE TO RELATED APPLICATIONS

This application is a Submission Under 35 U.S.C. § 371 for U.S. National Stage Patent Application of International Application Number: PCT/IB2019/053153, filed Apr. 16, 2019 entitled "METHODS PROVIDING TRAFFIC CONTROL FOR INCREASING DATA THROUGHPUT AND RELATED NETWORKS AND NETWORK NODES," the entirety of which is incorporated herein by reference.

TECHNICAL FIELD

The present disclosure relates generally to communications, and more particularly to providing methods for traffic control for increasing data throughput in a radio access network and related network nodes.

BACKGROUND

The third generation partnership project (3GPP) is currently working on standardization of the Evolved Universal Terrestrial Radio Access Network (E-UTRAN) radio access system, also called LTE (Long Term Evolution). LTE is part of the Evolved Packet System (EPS), also constituting the Evolved Packet Core (EPC). FIG. 1 illustrates an architecture of the EPS system, including radio access nodes (eNBs) and Evolved Packet System (EPS) nodes (Mobility Management Entity/Serving Gateway (MME/S-GW)). Referring to FIG. 1, logical interfaces are shown between eNBs and between an eNB and a MME/S-GW. The interface between eNBs is referred to as X2, and the interface between an eNB and an MME is denoted S1. The signaling transport over X2 and S1 may be implemented via Stream Control Transmission Protocol (SCTP) as illustrated, for example in 3GPP TS 36.412, 3GPP TS 36.422, and RFC4960.

The network elements (NE), e.g. 102, 104, and 112, also referred to as eNodeB, are managed by a domain manager (DM) 108, also referred to as the operation and support system (OSS). DM 108 may further be managed by a network Manager node (NM) 110. Two NEs are interfaced by X2, whereas the interface between two DMs is referred to as Itf-P2P. The management system may configure the network elements, as well as receive observations associated to features in the network elements. For example, DM may observe and configure NEs, while a NM may observe and configure DM, as well as NE via a DM.

Note that terminology used here such as eNB and network node are non-limiting terms used to denote wireless devices, such as base stations, network Manager nodes or a network node for an operating system of a radio access network. Additionally, other terminology such as "eNodeB" can be used in place of "eNB."

User equipment (UE, also referred to as a mobile terminal) mobility in the network will now be discussed. Although the term mobile terminal may be used herein, it is noted that this term encompasses other terms used to denote wireless devices, such as a UE. It should be understood by the person skilled in the art that "mobile terminal" is a non-limiting term comprising any mobile or wireless device or node equipped with a radio interface allowing for at least one of: transmitting signals in uplink, receiving and/or measuring signals in downlink. And transmitting and/or receiving signals in D2D/sidelink mode. A wireless device herein may comprise a UE (in its general sense) capable of operating or at least performing measurements in one or more frequencies, carrier frequencies, component carriers or frequency bands. As well as "wireless device" or "UE", the terms "mobile device" and "mobile terminal" may be used interchangeably in the description, and it will be appreciated that such a device does not necessarily have to be 'mobile' in the sense that it is carried by a user. Instead, the term "mobile terminal" encompasses any device that is capable of communicating with communication networks that operate according to one or more communications standards, such as Global System for Mobile communications (GSM), Universal Telecommunications System (UMTS), LTE, etc.

A task of a radio access network is to provide good, and if possible better, radio connections for the UEs to endeavor to provide the service UEs want to utilize. This may be done by moving UEs to suitable cells, for example, when a UE is in the connected mode or is at release via idle mode mobility control information (IMMCI). Each eNodeB needs to know the suitable cells that it can send information to about to the UE for these purposes.

Cell information exchange between eNodeBs will now be discussed. When a connection is setup between eNodeBs in E-UTRAN, each eNodeB exchanges information about the served cells. The information includes identities, frequency and bandwidth of the cell, as well as the neighbor cells of the served cell. In the receiving eNodeB, the information may be used for making decisions, for example which cell it should measure for connected mode mobility or prioritizing a carrier frequency at release, selecting a secondary cell for carrier aggregation, etc. For example, the bandwidth may be vital for certain services and a mobile terminal with such a service can only be moved to a cell with enough bandwidth.

In E-UTRAN, an X2 connection may be used to exchange cell information by using an X2 Setup or an eNB Configuration Update procedure. FIG. 2 is a message diagram illustrating operations/messages using an X2 setup procedure in a radio access network. Referring to FIG. 2, eNB 102 sends 202 a setup request message to eNB 104 over the X2 interface. Responsive to the setup request message, eNB 104 sends a setup response message to eNB 102 over the X2 interface.

FIG. 3 is a message diagram illustrating operations/messages using an eNB configuration update procedure in a radio access network. Referring to FIG. 3, eNB 102 sends a configuration update message 302 to eNB 104. eNB 104 may use information in the configuration update message to update the configurate of eNB 102 in eNB 104.

The following explanation of potential problems with existing solutions is a present realization as part of the present disclosure and is not to be construed as previously known by others. Transmission mode cell capability may only be known to its own eNodeB. Thus, each eNodeB may have information about transmission mode capability of its cells. For an eNB serving a UE, therefore, it may not be possible to know whether neighbor cells controlled by other eNBs are capable of providing a transmission mode that may support a higher data throughput of the UE.

SUMMARY

Some embodiments disclosed herein are directed to a method performed by a first network node in a radio access network. The first network node may have a first transmission mode configuration for a first cell. The operations may include obtaining a second transmission mode configuration from a second network node for a second cell. The operations may further include steering a mobile terminal to the first cell or the second cell based on which cell has the transmission mode configuration for supporting a higher data throughput.

A potential advantage of these operations is that transmission mode configurations of cells for neighboring nodes may by exchanged or determined for use in steering a mobile terminal to the cell having the transmission mode configuration for supporting a higher data throughput.

Some other embodiments disclosed herein are directed to a method performed by a receiving node in a radio access network. The receiving node may serve a first cell and having a first transmission mode. The operations may include receiving a message from a neighboring node. The message may include updated configuration data for a second transmission mode configuration of a second cell served by the neighboring node. The operations may further include using the updated configuration data to update information in the receiving node to include the transmission mode configuration of the neighboring node for the cell served by the neighboring node. Operations may further include steering a mobile terminal to the first cell or the second cell based on which cell has the transmission mode configuration for supporting a higher data throughput.

Some other embodiments disclosed herein are directed to a method performed by a control node in a radio access network. The operations may include determining a first transmission mode configuration of a candidate node for a candidate cell. The operations may further include determining a second transmission mode configuration of a serving node for a serving cell. The operations may further include configuring the serving node with the first transmission mode configuration. The operations may further include steering a mobile terminal to the candidate cell or the serving cell based on which cell has the transmission mode configuration for supporting a higher data throughput.

Other network nodes and corresponding methods and computer program products according to embodiments of the inventive subject matter will be or become apparent to one with skill in the art upon review of the following drawings and detailed description. It is intended that all such additional network node, methods, and computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 5 is a table illustrating a comparison between peak throughputs among various transmission modes according to some embodiments of inventive concepts;

FIG. 6 is a table illustrating an identification in a message identifying a transmission mode configuration according to some embodiments of inventive concepts;

FIG. 7 is a table illustrating an identification in a message identifying a transmission mode configuration according to some embodiments of inventive concepts;

FIG. 8 is a table illustrating an identification in a message identifying a transmission mode configuration according to some embodiments of inventive concepts;

FIG. 9 is a table illustrating an identification in a message identifying a transmission mode configuration according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

Multiple input multiple output (MIMO) is an advanced-LTE concept. MIMO is used to increase the overall bitrate through transmission of two (or more) different data streams on two (or more) different antennas—using the same resources in both frequency and time, separated only through use of different reference signals—to be received by two or more antennas in a 3GPP network.

Figure 4:
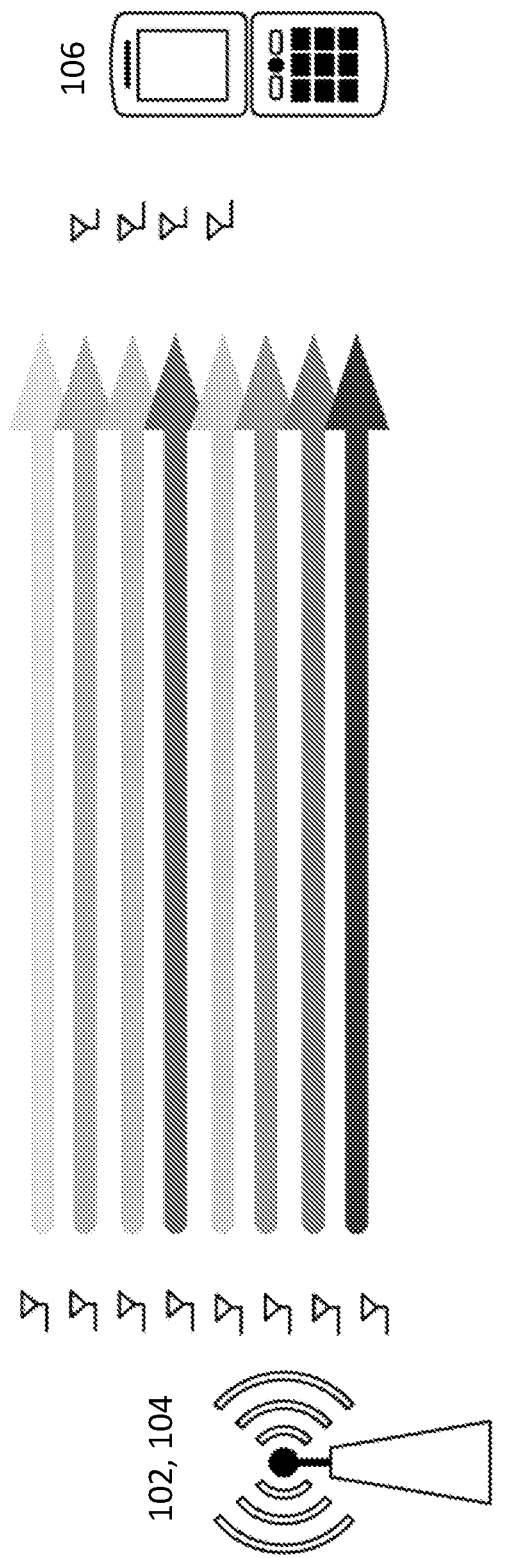
FIG. 4 is a schematic diagram illustrating transmission mode 9 with an 8×4 antenna configuration according to some embodiments of inventive concepts.

In an LTE network, Transmission Mode 9 (TM9) is a release-10 feature where a UE can be configured to support 2 or 4 MIMO layers. FIG. 4 is a schematic diagram illustrating Transmission Mode 9 with an 8×4 antenna configuration according to some embodiments of inventive concepts. For example, with TM9 8×4, a UE under good channel condition may get 60% average throughput gain compared with TM3 8×2.

Further, TM9 with 4-layer MIMO support may provide 87% or 79% throughput gain over 2-layer MIMO respectively for 64 QAM and 256 QAM. FIG. 5 is a table illustrating a comparison between peak throughputs among various transmission modes according to some embodiments of inventive concepts. As shown in FIG. 5, a UE with TM9 8×4 support may provide 174.89 mbps peak throughput over 2-layer MIMO for 64 QAM (93.4784 mbps for TM9 8×2 and 112.4736 mbps for TM3 8×2); and a UE with TM9 8×4 support may provide 233.9256 mbps peak throughput over 2 layer MIMO for 256 QAM (130.088 mbps peak for TM9 8×2 and 142.985 mbps for TM3 8×2).

TM9 capability may be configured for each cell on a node level on each eNodeB.

Although various embodiments are described in the example context of TM9, these and other embodiments can be used for other transmission modes including, but not limited to, multilayer MIMO transmission modes.

As discussed above, a UE with TM9 support in good condition may get about 60% average throughput gain over TM3 8×2; and about 79-87% throughput gain for 4-layer MIMO over 2-layer MIMO. However, TM9 cell capability is only known to its own eNodeB. Thus, each eNodeB has information about its own TM9 capable cells. For an eNB serving a UE, it may not be possible to know whether neighbor cells controlled by other eNBs are capable of providing TM9. Therefore, UEs that would benefit from TM9 may unnecessarily be moved to cells that cannot provide TM9. Moving UEs to cells that cannot provide TM9 may lead to a decreased or failed service for UEs. The current eNodeB does not have information about capable cells controlled by neighbor eNBs. This information is needed when a TM9 capable UE needs to camp on another cell in a neighbor eNodeB (for example, a TM9 capable cell in neighbor eNodeB might need to be prioritized for a TM9 capable UE at release. A TM9 capable cell also may be used for handover (HO) at setup after UE capability exchange or at poor coverage, or for carrier aggregation purposes, etc.), the current eNodeB may not have information about such capable cells controlled by neighbor eNBs.

The terms neighbor eNodeB or neighbor node include direct or indirect neighbor eNodeBs or neighbor nodes.

A problem with not having information about a TM9 capable cell on a neighbor eNodeB may be that a UE might not benefit from potential higher throughput gain of a TM9 configuration.

In some embodiments disclosed herein, when an eNodeB communicates with another neighbor eNodeB, for example during X2 setup and response and/or during a configuration update, a message(s) that includes a transmission mode configuration for a cell served by the neighbor eNodeB identifies whether the cell is TM9 capable or not. For example, the message(s) may include an Information Element (IE) identifying Served Cell Information which indicates whether the cell is TM9 capable or not.

Potential advantages of embodiments of the present disclosure may include operations for exchanging TM9 cell capability between neighbor eNodeBs that may enable a TM9 capable UE to utilize a TM9 capable cell to improve traffic control. Examples include, but are not limited to:

At release, prioritizing TM9 capable coverage for a TM9 capable UE;
At setup, triggering a TM9 capable UE to select a TM9 capable cell;
At poor coverage, moving a TM9 capable UE to a TM9 capable cell; and/or
Using TM9 capable cells as secondary cells for Carrier Aggregation, etc.

Furthermore, the system may avoid moving UEs that do not benefit from TM9 to TM9 capable LTE cells, thereby freeing up resources for UEs that benefit from TM9 and improving the total potential capacity of the system.

Figure 1:
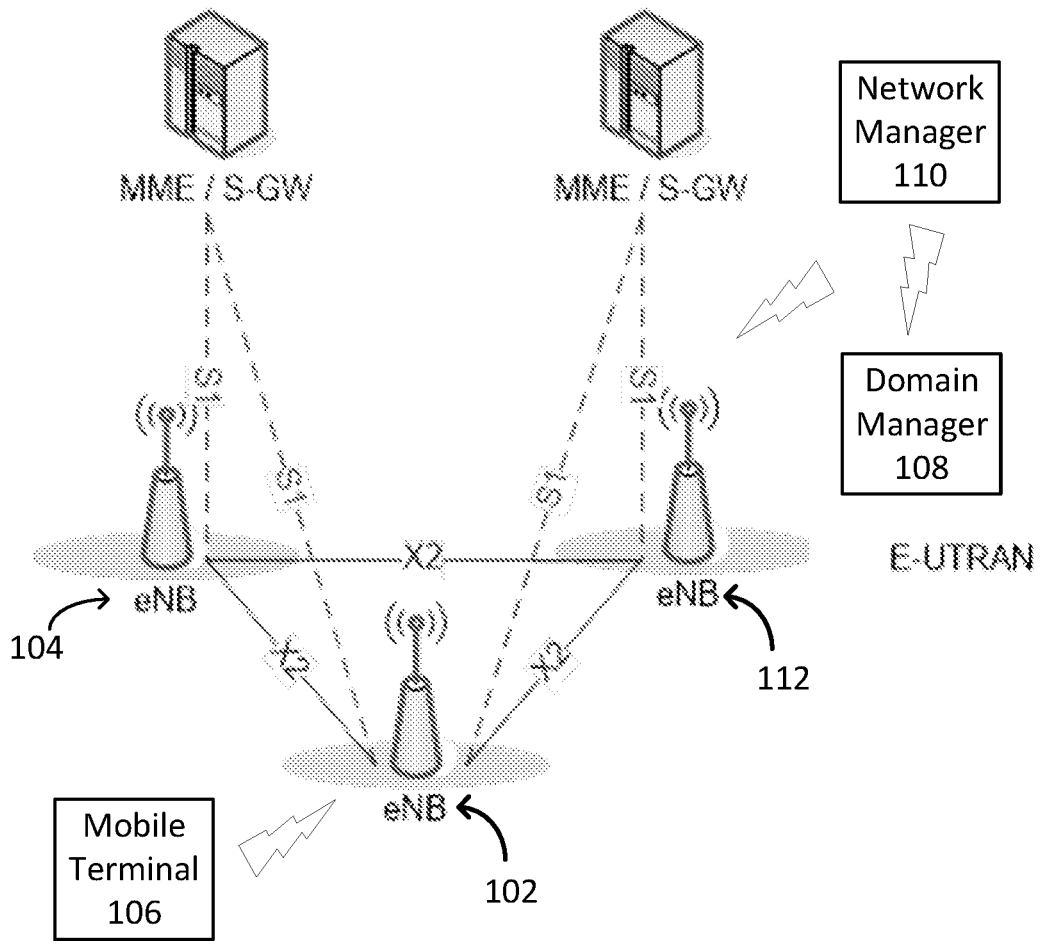
FIG. 1 is a schematic diagram illustrating an LTE architecture including network nodes and a mobile terminal in accordance with some embodiments of inventive concepts.
Figure 2:
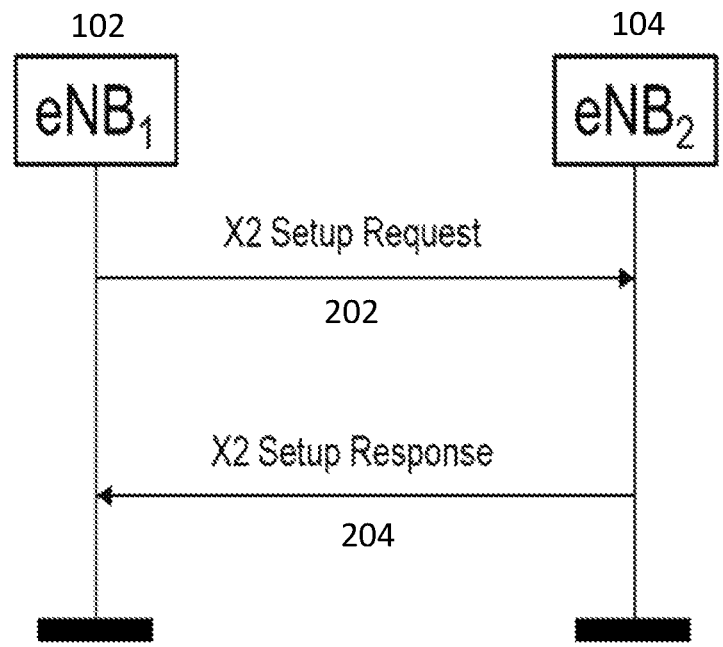
FIG. 2 is a message diagram illustrating operations/messages in a radio access network.
Figure 3:
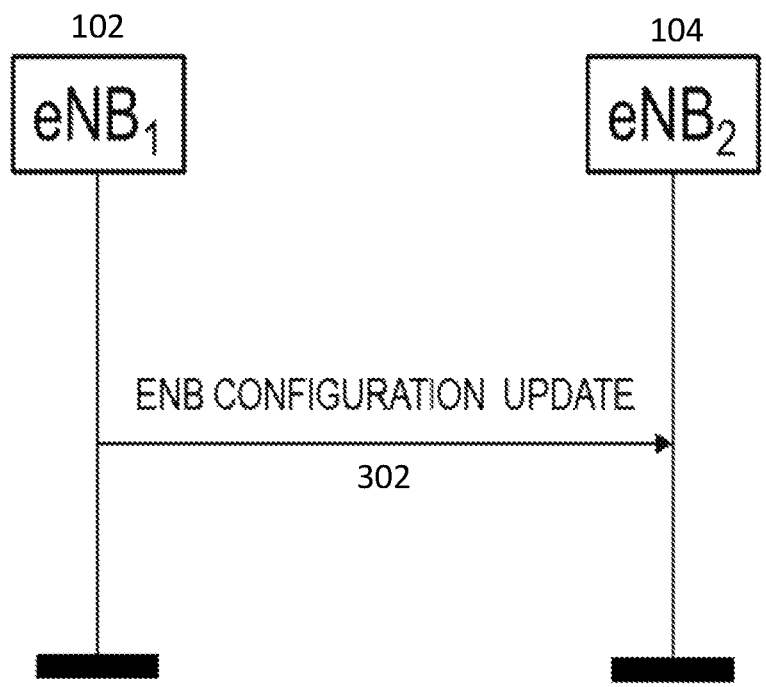
FIG. 3 is a message diagram illustrating operations/messages in a radio access network.

FIGS. 6-9 are tables illustrating IEs included in messages between eNodeBs, or between an eNodeB and a control node, for identifying a transmission mode configuration according to some embodiments of inventive concepts. In some embodiments, the IEs shown in FIGS. 6-9 may be included in, e.g., the X2 Setup Request message and X2 Setup Response message shown in FIG. 2. In other embodiments, the IEs shown in FIGS. 6-9 also may be included in, e.g., the eNodeB Configuration Update message shown in FIG. 3. In another embodiment, the IEs shown in FIGS. 6-9 may be used by a control node (e.g., network Manager node 110) in configuring a serving node (e.g., node 104), as discussed further below.

Referring to FIG. 6, in some embodiments, an IE including an indicator of the TM9 capability of a cell may be provided. This IE may be referred to as a TM9 capable IE. The TM9 capable IE may include a bit having a value. The value may be 0 for not TM9 capable or 1 for TM9 capable.

Referring to FIG. 7, in other embodiments, an IE including an indicator for the MIMO layer support for a cell may be provided. This IE may be referred to as a TM9 MIMO layer capability IE. The TM9 MIMO layer capability IE may include an indicator defining whether the cell supports MIMO two layers, four layers, or eight layers, etc.

Referring to FIG. 8, in another embodiment, an IE including an indicator for TM9 MIMO 4-layers capability may be provided. This IE may be referred to as a TM9 MIMO 4-layers capability IE. The TM9 MIMO 4-layers capability IE may include an indicator defining whether the cell supports four-layers MIMO. The TM9 MIMO 4-layers capability IE may include a bit having a value. The value may be 0 for support for four-layers MIMO TM9 is not enabled. The value may be 1 for support for four-layers MIMO TM9 is enabled.

Still referring to FIG. 8, this approach may enable mapping of UE capability (both TM9 capability & MIMO layer support capability) with the cell capability of a serving node and a candidate node, or both. In various embodiments, this approach may operate to correlate UE potential with corresponding potential available for the cell.

Referring to FIG. 9, in a further embodiment, an IE including a bit string may be provided where each bit may represent one of the TM9 capabilities for a cell. The first bit in the bit string may define whether the cell is TM9 capable. The second bit in the bit string may define whether the cell supports two MIMO layers. The third bit in the bit string may define whether the cell supports four MIMO layers. The fourth bit in the bit string may define whether the cell supports eight MIMO layers. Other bits may be reserved for future use. Each bit may have a value. The value may be 0 for not present or 1 for present.

Figure 10:
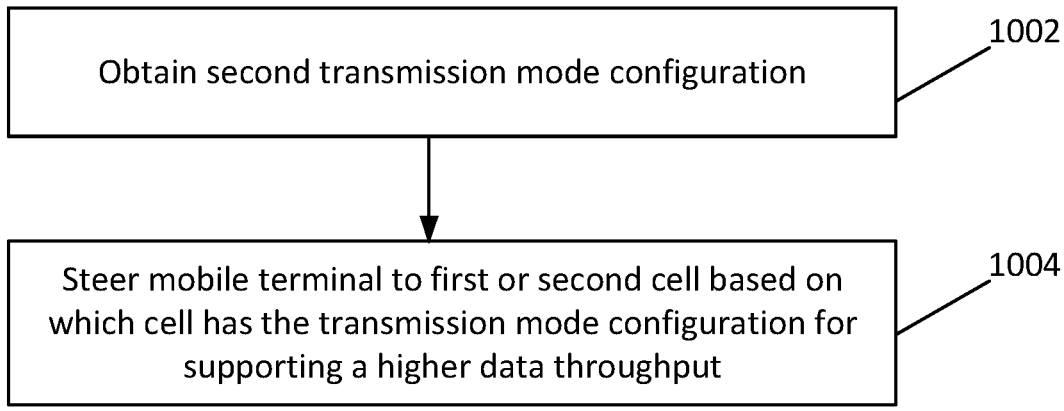
FIGS. 10-12 are flowcharts illustrating methods implemented in a radio access network including network nodes and a mobile terminal according to some embodiments of inventive concepts.
Figure 11:
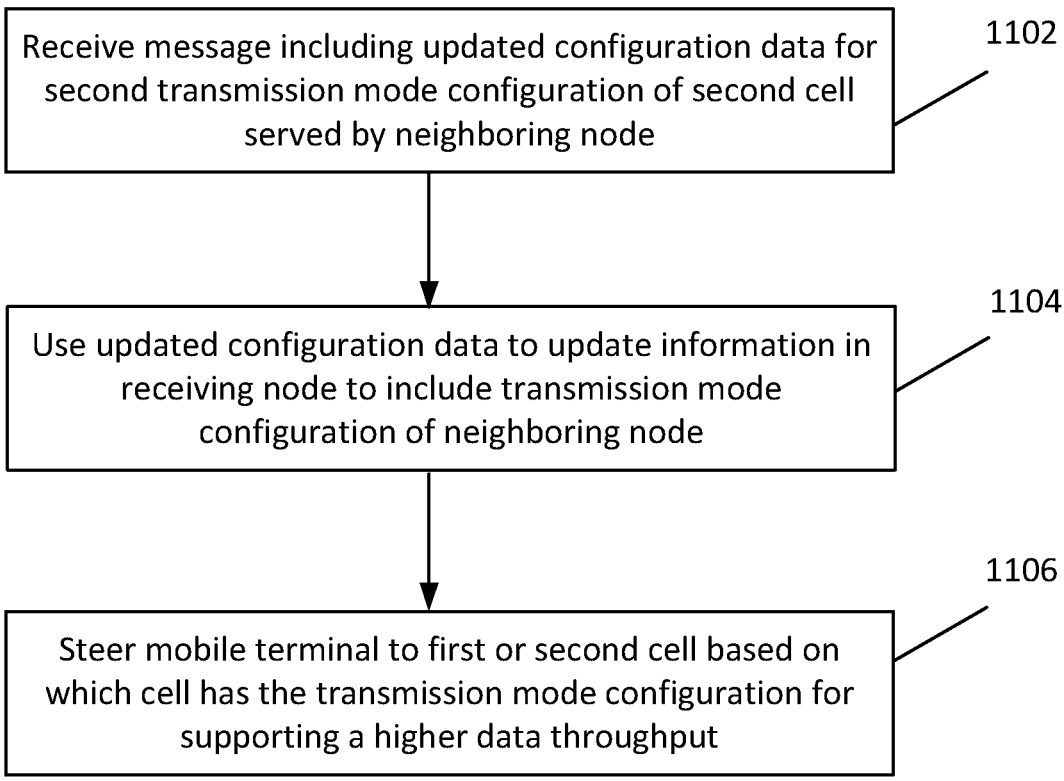
Figure 12:
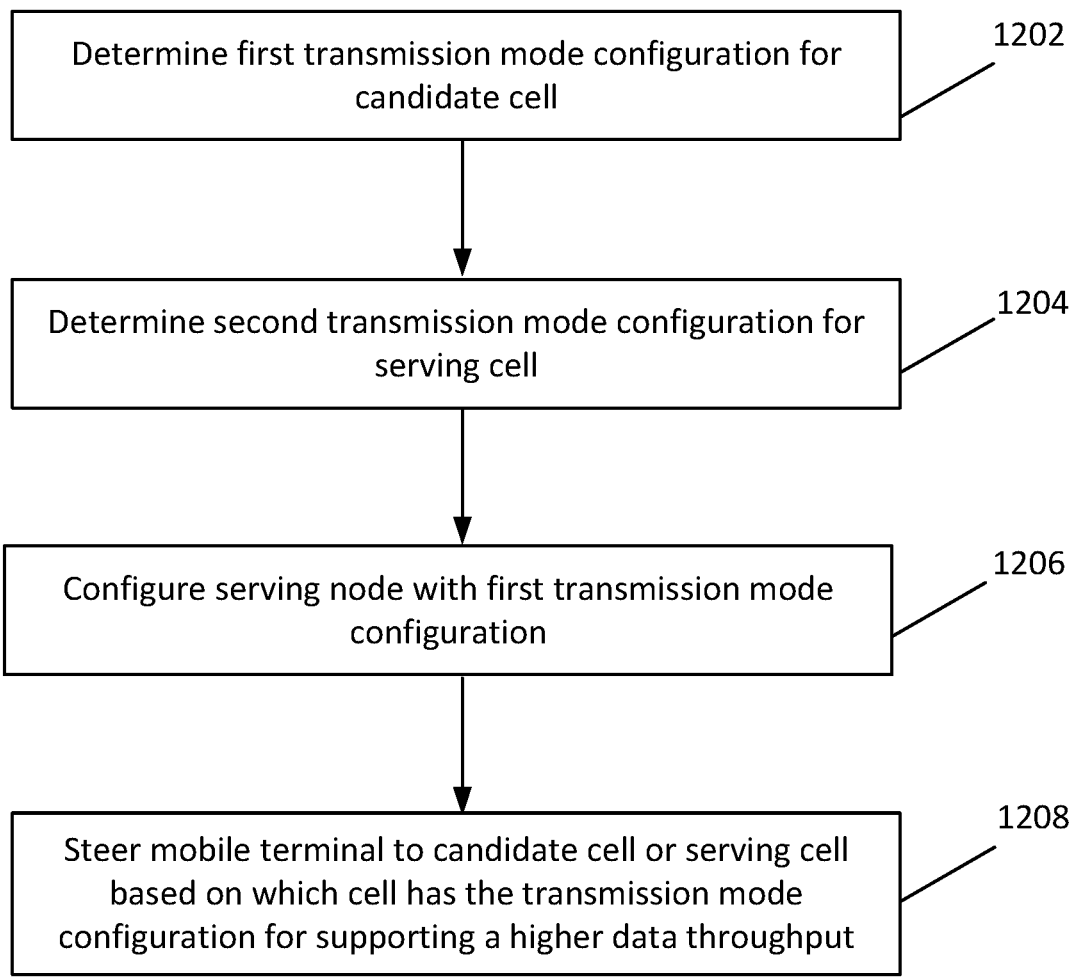

These and other related operations will now be described in the context of the operational flowcharts of FIGS. 10-12. FIG. 10 is a flowchart of operations that may be performed by a network node, e.g., when a connection is setup between eNBs over interface X2 in E-UTRAN. FIG. 11 is a flowchart of operations that may be performed by a network node, e.g., during eNB configuration update procedures over interface X2. FIG. 12 is a flowchart of operations that may be performed by, e.g., a network Manager node or a node within an operating system for the network.

Referring initially to FIG. 10, operations may be performed by network node 102 (e.g., 1400 in FIG. 14) having a first transmission mode configuration for a first cell in a radio access network. The operations include obtaining 1002 a second transmission mode configuration from a second network node (e.g., 104) for a second cell. The operations further include steering 1004 mobile terminal 106 (e.g., 1300 in FIG. 13) to the first cell or the second cell based on which cell has the transmission mode configuration for supporting a higher data throughput.

The operation of obtaining 1002 may include network node 102 sending a message to a second network node (e.g., 104). The message may include a first identification of the first transmission mode. Responsive to the message, first network node 102 may receive a response message from second network node 104. The response message may include a second identification of the second transmission mode.

In at least some embodiments, the first and/or second transmission modes may include a multilayer multiple input multiple output (MIMO) transmission mode.

In some embodiments, the first and/or second transmission modes may be long term evolution (LTE) transmission mode 9 (TM9).

In at least some embodiments, the first and/or second identifications may include a defined value specifying whether the cell of the first network node (or second network node) is configured for a defined transmission mode. The first and/or second identifications may be an indicator in the message and/or response message defining a value specifying whether the cell of the first network node (or second network node) is configured for a defined transmission mode. The indicator may be, e.g., a bit. The bit may have a value. The value may include, e.g., 0 for defined transmission mode not present or 1 for defined transmission mode present. The defined transmission mode may include, but is not limited to, a multilayer MIMO transmission mode, LTE TM9, or other transmission modes capable of higher data throughput (e.g., in comparison to 64 QAM or 256 QAM).

In some embodiments, the first identification may include an indicator specifying whether the cell of first network node 102 supports a defined number of layers of the first transmission mode. The second identification also may include an indicator specifying whether the cell of second network node 104 supports a defined number of layers of the second transmission mode. The indicator in the first or second identification may be, e.g., enumerated. The enumeration may include, e.g., "twolayers" for the cell supporting MIMO two-layers; "fourlayers" for the cell supporting MIMO four-layers; "eightlayers" for the cell supporting MIMO 8-layers; etc.

In other embodiments, the first identification may include an indicator specifying whether the cell of the first network node supports a four-layer first transmission mode. The second identification also may include an indicator specifying whether the cell of the second network node supports a four-layer second transmission mode. The indicator in the first or second identification may be, e.g., a bit string. The bit string may include one bit that indicates whether a cell supports four-layers MIMO. The value of the bit may be 0 indicating, e.g., support for four-layers MIMO TM9 is not enabled. The value of the bit may be 1 indicating, e.g., support for four-layers MIMO TM9 is enabled.

In other embodiments, the indicator in the first identification may include a bit string. The bit string may include a plurality of bits where each bit defines a transmission mode characteristic of first network node 102. Each of the plurality of bits may include at least one of: a value defining whether the first cell is configured for the defined transmission mode, a value defining whether the first cell supports a defined number of layers of the multiple input multiple output transmission mode, a value defining whether the first cell supports a four-layer multiple input multiple output transmission mode, and a value defining whether the first cell supports an eight-layer multiple input multiple output transmission mode.

In other embodiments, the indicator in the second identification may include a bit string. The bit string may include a plurality of bits where each bit defines a transmission mode characteristic of second network node 104. Each of the plurality of bits includes at least one of: a value defining whether the second cell is configured for the defined transmission mode, a value defining whether the second cell supports a defined number of layers of the multiple input multiple output transmission mode, a value defining whether the second cell supports a four-layer multiple input multiple output transmission mode, and a value defining whether the second cell supports an eight-layer multiple input multiple output transmission mode.

With reference to FIG. 11, in other embodiments, further operations may be performed by a receiving node 104 (e.g., 1400 in FIG. 14), e.g., during a configuration update procedure over interface X2. Receiving node 104 may serve a first and have a first transmission mode configuration. The operations include receiving 1102 a message from a neighboring node (e.g., 102). The message may include updated configuration data of a second transmission mode configuration for a second cell served by neighboring node 102. The operations further include using 1104 the updated configuration data to update information in receiving node 104 to include the transmission mode configuration of neighboring node 102 for the cell served by neighboring node 102. The operations further include steering 1106 mobile terminal 106 to the first cell of the second cell based on which cell has the transmission mode configuration for supporting a higher data throughput.

In at least some embodiments, the first and/or second transmission modes may include a multilayer multiple input multiple output (MIMO) transmission mode.

In some embodiments, the first and/or second transmission modes may be long term evolution (LTE) transmission mode 9 (TM9).

In at least some embodiments, the updated configuration data may include a defined value specifying whether the cell of neighboring node 102 is configured for a defined transmission mode. The updated configuration data may include an indicator in the message specifying whether the cell of neighboring node 102 is configured for a defined transmission mode. The indicator may be, e.g., a bit. The bit may have a value. The value may include, e.g., 0 for defined transmission mode not present or 1 for defined transmission mode present. The defined transmission mode may include, but is not limited to, a multilayer MIMO transmission mode, LTE TM9, or other transmission modes capable of higher data throughput (e.g., in comparison to 64 QAM or 256 QAM).

In some embodiments, the updated configuration data may include an indicator specifying whether the cell served by neighboring node 102 supports a defined number of layers of the MIMO transmission mode. The indicator may be, e.g., enumerated. The enumeration may include, e.g., "twolayers" for the cell supporting MIMO two-layers; "fourlayers" for the cell supporting MIMO four-layers; "eightlayers" for the cell supporting MIMO 8-layers; etc.

In other embodiments, the updated configuration data may include an indicator specifying whether the cell served by neighboring node 102 supports a four-layer transmission mode. The indicator may be, e.g., a bit string. The bit string may include one bit that indicates whether a cell supports four-layers MIMO. The value of the bit may be 0 indicating, e.g., support for four-layers MIMO TM9 is not enabled. The value of the bit may be 1 indicating, e.g., support for four-layers MIMO TM9 is enabled.

In other embodiments, the updated configuration data may include a bit string. The bit string may include a plurality of bits where each bit defines a transmission mode characteristic of neighboring node 102. Each of the plurality of bits may include at least one of: a value defining whether the served cell of the neighboring node is configured for the defined transmission mode, a value defining whether the served cell of the neighboring node supports a defined number of layers of the multiple input multiple output transmission mode, a value defining whether the served cell of the neighboring node supports a four-layer multiple input multiple output transmission mode, and a value defining whether the served cell of the neighboring node supports an eight-layer multiple input multiple output transmission mode.

Figure 13:
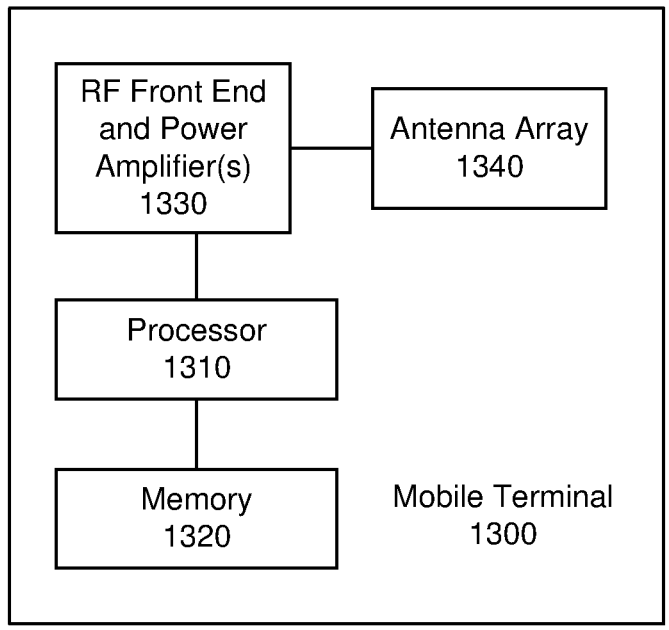
FIG. 13 is a block diagram illustrating a mobile terminal (also referred to as user equipment) according to some embodiments of inventive concepts.
Figure 14:
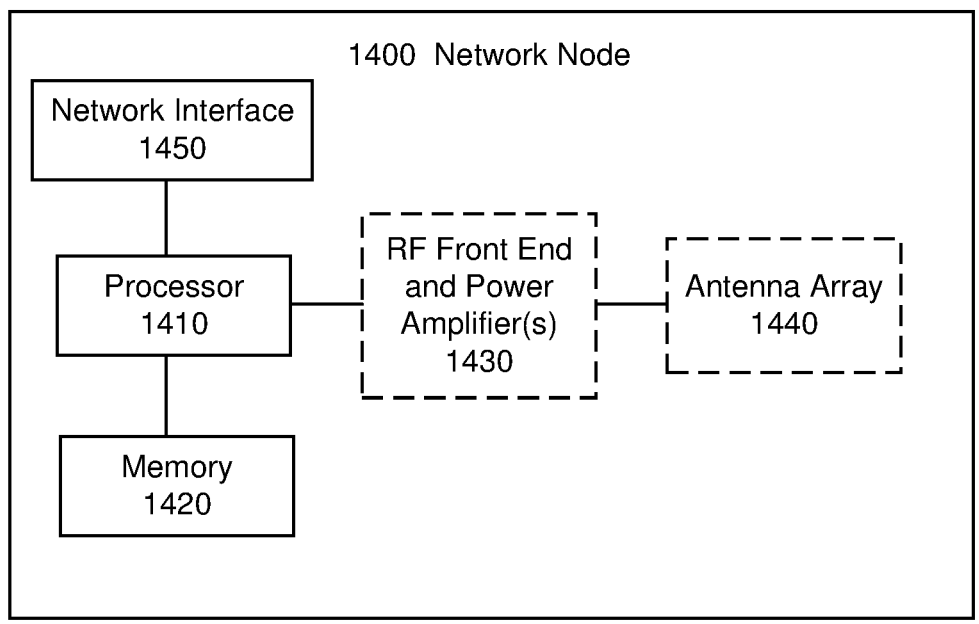
FIG. 14 is a block diagram illustrating a network node according to some embodiments of inventive concepts.

With reference to FIG. 12, in other embodiments, further operations may be performed by a control node 110 (e.g., 1400 in FIG. 14). Control node 110 may be a node that manages eNodeBs either directly or indirectly (e.g., through domain manager 108). Control node 110 may include, but is not limited to, a network Manger node or a node within the operating system of the radio access network. The operations include determining 1202 a first transmission mode configuration of a candidate node 102 for a candidate cell. The operation of determining 1202 may be performed by reading the first transmission mode configuration from candidate node 102. The operations further include determining 1204 a second transmission mode configuration of serving node 104 for a serving cell. The operation of determining 1204 may by performed by reading the second transmission mode configuration from serving node 104. The operations further include configuring 1206 serving node 104 with the first transmission mode configuration. The operations further include steering 1208 mobile terminal 106 (e.g., 1300 in FIG. 13) to the candidate cell or the serving cell based on which cell has the transmission mode configuration for supporting a higher data throughput.

In at least some embodiments, the first and/or second transmission modes may include a multilayer multiple input multiple output (MIMO) transmission mode.

In some embodiments, the first and/or second transmission modes may be long term evolution (LTE) transmission mode 9 (TM9).

In at least some embodiments, the first transmission mode configuration includes a defined value specifying whether the candidate cell of candidate node 102 is configured for a defined transmission mode. The defined value may be represented in, e.g., a bit. The value may include, e.g., 0 for defined transmission mode not present or 1 for defined transmission mode present. The defined transmission mode may include, but is not limited to, a multilayer MIMO transmission mode, LTE TM9, or other transmission modes capable of higher data throughput (e.g., in comparison to 64 QAM or 256 QAM).

In some embodiments, the second transmission mode configuration includes a defined value specifying whether the serving cell of serving node 104 is configured for a defined transmission mode. The defined value may be represented in, e.g., a bit. The value may include, e.g., 0 for defined transmission mode not present or 1 for defined transmission mode present. The defined transmission mode may include, but is not limited to, a multilayer MIMO transmission mode, LTE TM9, or other transmission modes capable of higher data throughput (e.g., in comparison to 64 QAM or 256 QAM).

In some embodiments, the first transmission mode configuration may include an indicator specifying whether the candidate cell of candidate node 102 supports a defined number of layers of the first transmission mode. The indicator may be, e.g., enumerated. The enumeration may include, e.g., "twolayers" for the cell supporting MIMO two-layers; "fourlayers" for the cell supporting MIMO four-layers; "eightlayers" for the cell supporting MIMO 8-layers; etc.

In some embodiments, the second transmission mode configuration may include an indicator specifying whether the serving cell of serving node 104 supports a defined number of layers of the first transmission mode. The indicator may be, e.g., enumerated. The enumeration may include, e.g., "twolayers" for the cell supporting MIMO two-layers; "fourlayers" for the cell supporting MIMO four-layers; "eightlayers" for the cell supporting MIMO 8-layers; etc.

In other embodiments, the first transmission mode configuration may include an indicator specifying whether the candidate cell of candidate node 102 supports a four-layer first transmission mode. The second transmission mode configuration also may include an indicator specifying whether the serving cell of the serving node 104 supports a four-layer second transmission mode. The indicator in the first or second transmission mode configurations may be, e.g., a bit string. The bit string may include one bit that indicates whether a cell supports four-layers MIMO. The value of the bit may be 0 indicating, e.g., support for four-layers MIMO TM9 is not enabled. The value of the bit may be 1 indicating, e.g., support for four-layers MIMO TM9 is enabled.

In other embodiments, the first transmission mode may include a bit string. The bit string may include a plurality of bits where each bit defines a transmission mode characteristic of candidate node 102. Each of the plurality of bits may include at least one of: a value defining whether the candidate cell is configured for the defined transmission mode, a value defining whether the candidate cell supports a defined number of layers of the multiple input multiple output transmission mode, a value defining whether the candidate cell supports a four-layer multiple input multiple output transmission mode, and a value defining whether the candidate cell supports an eight-layer multiple input multiple output transmission mode.

In other embodiments, the second transmission mode may include a bit string. The bit string may include a plurality of bits where each bit defines a transmission mode characteristic of serving node 104. Each of the plurality of bits may include at least one of: a value defining whether the serving cell is configured for the defined transmission mode, a value defining whether the serving cell supports a defined number of layers of the multiple input multiple output transmission mode, a value defining whether serving cell supports a four-layer multiple input multiple output transmission mode, and a value defining whether the serving cell supports an eight-layer multiple input multiple output transmission mode.

FIG. 13 is a block diagram illustrating a mobile terminal 1300 that is configured according to some embodiments.

Mobile terminal 1300 can include, without limitation, a wireless terminal, a wireless communication device, a wireless communication terminal, a terminal node/UE/device, etc. Mobile terminal 1300 includes a RF front-end 1330 comprising one or more power amplifiers the transmit and receive through antennas of an antenna array 1340 to provide uplink and downlink radio communications with a radio network node (e.g., a base station, eNB, gNB, etc.) of a telecommunications network. Mobile terminal 1300 further includes a processor circuit 1310 (also referred to as a processor) coupled to the RF front end 1330 and a memory circuit 1320 (also referred to as memory). The memory 1320 stores computer readable program code that when executed by the processor 1310 causes the processor 1310 to perform operations according to embodiments disclosed herein.

FIG. 14 is a block diagram illustrating a network node 1400 (e.g., a base station, eNB, gNB, network Manager node, control node, etc.) of a radio access network. The network node 1400 includes a processor circuit 1410 (also referred to as a processor), a memory circuit 1420 (also referred to as memory), and a network interface 1450 (e.g., wired network interface and/or wireless network interface) configured to communicate with other network nodes. The network node 1400 may be configured as a radio network node containing a RF front end with one or more power amplifiers 1430 that transmit and receive through antennas of an antenna array 1440. The memory 1420 stores computer readable program code that when executed by the processor 1410 causes the processor 1410 to perform operations according to embodiments disclosed herein.

Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a receiving node serving a first cell and having a first transmission mode configuration in a radio access network comprising:
   receiving a message from a neighboring node, the message includes including updated configuration data for a second transmission mode configuration of a second cell served by the neighboring node;
   using the updated configuration data to update information in the receiving node to include the second transmission mode configuration of the neighboring node for the second cell served by the neighboring node; and
   steering a mobile terminal to one of the first cell and the second cell based on whether the first transmission mode or the second transmission mode supports a higher data throughput.

2. The method of claim 1, wherein at least one of the first and the second transmission modes includes a multilayer multiple input multiple output transmission mode.

3. The method of claim 1, wherein the at least one of the first and the second transmission modes includes long term evolution transmission mode 9.

4. The method of claim 1, wherein the updated configuration data includes an indicator having a defined value specifying whether the second cell of the neighboring node is configured for a defined transmission mode.

5. The method of claim 1, wherein the updated configuration data includes an indicator specifying whether the second cell served by the neighboring node supports a defined number of layers of a multiple input multiple output transmission mode.

6. The method of claim 1, wherein the updated configuration data includes an indicator specifying whether the second cell served by the neighboring node supports a four-layer transmission mode.

7. The method of claim 1, wherein the updated configuration data includes an indicator comprising a bit string, wherein the bit string includes a plurality of bits each bit defining a transmission mode characteristic of the neighboring node.

8. The method of claim 7, wherein the each bit of the plurality of bits include at least one of: a value defining whether the second cell of the neighboring node is configured for the defined transmission mode, a value defining whether the second cell of the neighboring node supports a defined number of layers of a multiple input multiple output transmission mode, a value defining whether the second cell of the neighboring node supports a four-layer multiple input multiple output transmission mode, and a value defining whether the second cell of the neighboring node supports an eight-layer multiple input multiple output transmission mode.

9. A receiving node serving a first cell and having a first transmission mode configuration in a radio access network comprising:
   at least one processor; and
   at least one memory connected to the at least one processor and storing program code that is executed by the at least one processor to perform operations comprising:
   receiving a message from a neighboring node, wherein the message includes updated configuration data for a second transmission mode configuration of a second cell served by the neighboring node;
   using the updated configuration data to update information in the receiving node to include the second transmission mode configuration of the neighboring node for the second cell served by the neighboring node; and
   steering a mobile terminal to one of the first cell and the second cell based on whether the first transmission mode or the second transmission mode supports a higher data throughput.

* * * * *